Sept. 22, 1936.  F. H. HAGNER  2,055,148
ASTRONOMICAL INSTRUMENT
Filed April 18, 1934  3 Sheets-Sheet 1

Inventor
FREDERICK HAYES HAGNER
Attorney

Sept. 22, 1936.  F. H. HAGNER  2,055,148
ASTRONOMICAL INSTRUMENT
Filed April 18, 1934  3 Sheets-Sheet 2
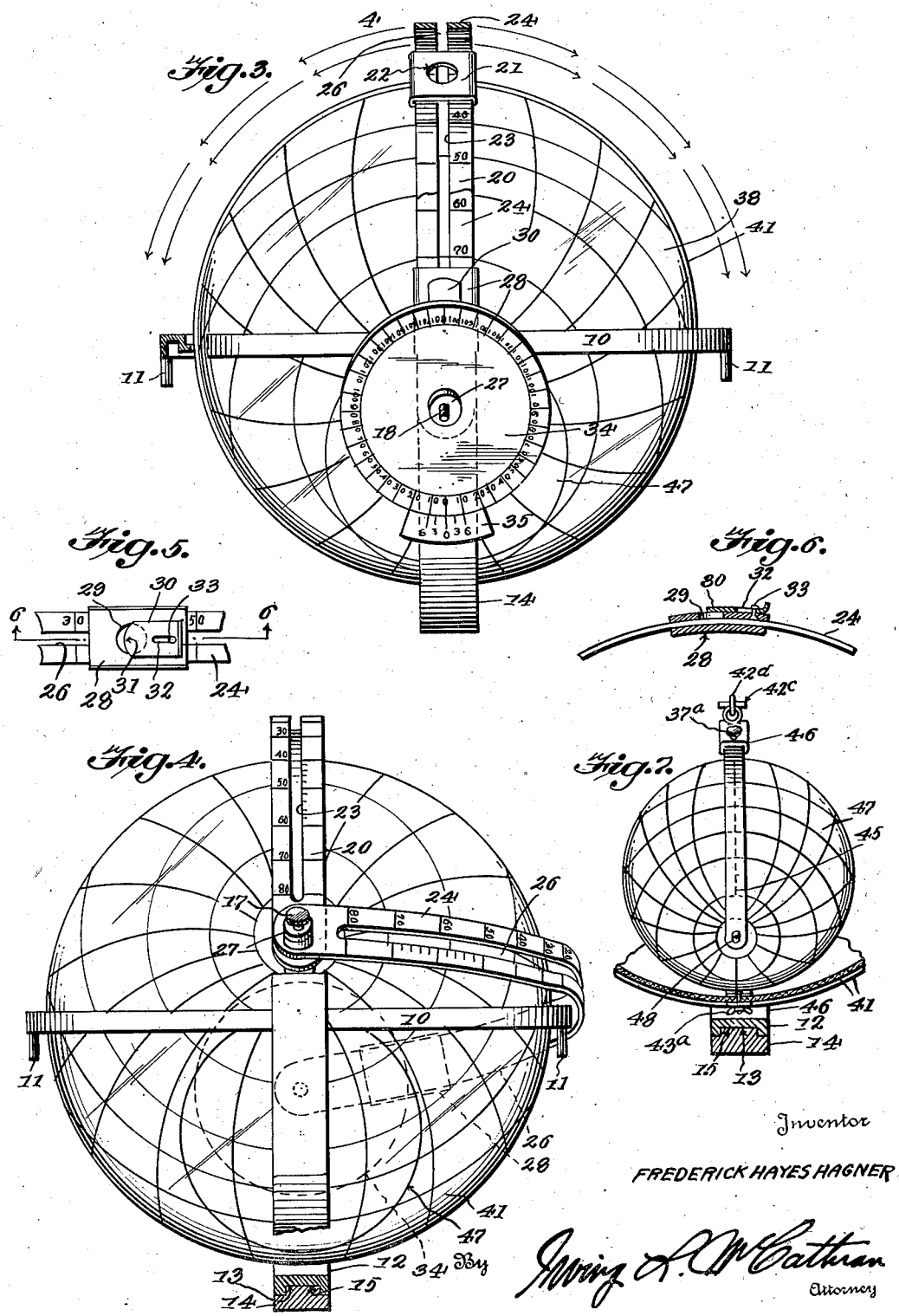

Sept. 22, 1936.　　　F. H. HAGNER　　　2,055,148
ASTRONOMICAL INSTRUMENT
Filed April 18, 1934　　　3 Sheets-Sheet 3
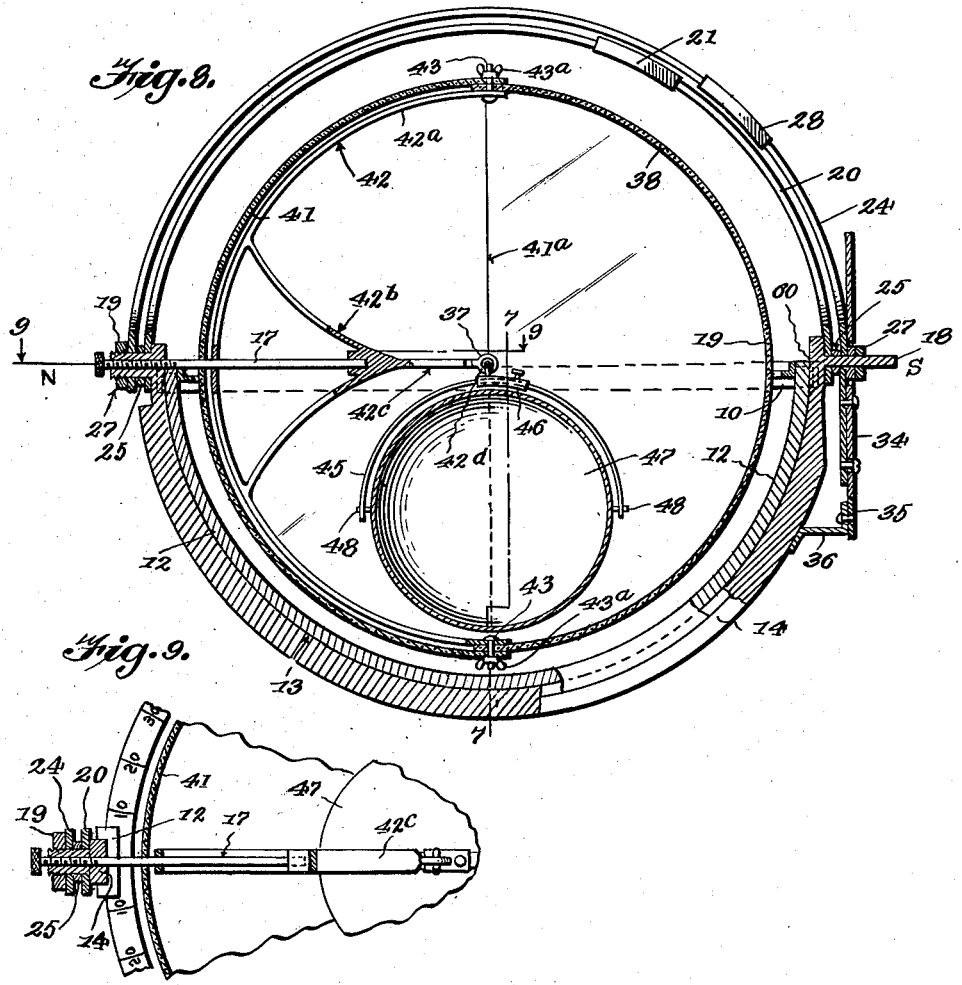

Patented Sept. 22, 1936

2,055,148

UNITED STATES PATENT OFFICE 2,055,148

ASTRONOMICAL INSTRUMENT

Frederick Hayes Hagner, San Antonio, Tex., assignor to Position Finder Corporation, San Antonio, Tex., a corporation of Texas Application April 18, 1934, Serial No. 721,197

14 Claims. (Cl. 35—43)

This invention relates to an astronomical instrument and has for its object the production of a simple and efficient means for facilitating the designation of the location of a selected celestial body relative to a selected location upon the earth's surface at a given time.

Another object of this invention is the production of a simple and efficient device for facilitating the study of astronomy whereby a student or observer may with great facility ascertain the relative position of a selected celestial body and a selected location or point upon the surface of the earth as depicted by a globe constituting a part of the device.

A further object of this invention is the production of a simple and efficient instrument or device especially constructed for the purpose of the study of astronomy and the relative locations of selected celestial bodies and certain selected points upon a globe representing the earth, whereby a student or observer may without a complicated method of calculation accurately visualize the relative positions of a selected celestial body and a selected point or location upon the surface of the earth.

A still further object of the invention is the production of a simple and efficient means for facilitating the demonstration of the relative location and path of movement of selected celestial bodies with repect to the earth's surface, as well as to demonstrate the differences in appearance of the celestial bodies at different times, such for instance as the changes which occur in the moon.

Other objects and advantages of the present invention will appear throughout the following specification and claims.

In the drawings:—

Figure 3 is a side elevation taken at right angles to Figure 1, certain parts being shown in section;

Figure 4 is a side elevation looking at the opposite side of the device to that as shown in Figure 3, certain parts being shown in section;

Figure 5 is a top plan view of the adjustable slide carried by the moon indicating arc to facilitate the demonstration of the changes of the moon as the moon appears when viewed from the earth at different times;

Figure 6 is a section taken on line 6—6 of Figure 5;

Figure 7 is a section taken on line 7—7 of Figure 8;

Figure 8 is a vertical sectional view through the entire device;

Figure 9 is a section taken on line 9—9 of Figure 8;

Figure 1:
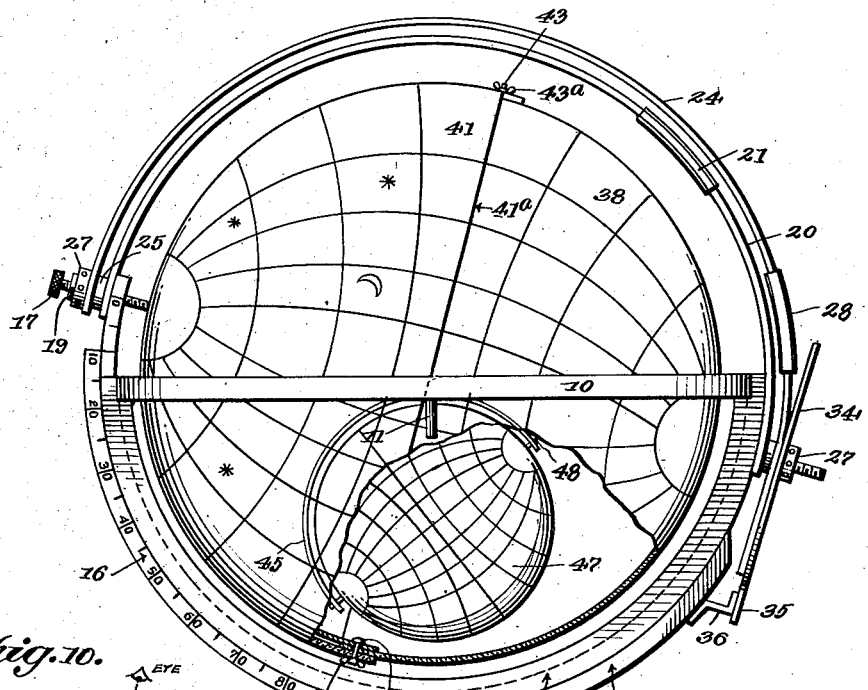
Figure 1 is a side elevation of the improved educational or astronomical instrument, partly shown in section.

By referring to the drawings, and more particularly to the structure shown in Figures 1 to 9 inclusive, it will be seen that there is provided a circular azimuth ring 10 which extends preferably in a horizontal plane, and in a level position. This azimuth ring 10 is provided with a suitable azimuth table, or is suitably graduated as indicated clearly in Figure 2, the graduations being arranged to run from 0 at the north pole to 180 degrees toward the south pole, on either side of the central axis of the ring 10. This is indicated clearly in Figure 2. This azimuth ring 10 carries a pair of depending lugs or pins 11 which may be engaged by a suitable support. Suspended below the azimuth ring 10 is a track ring 12, which track ring 12 extends in a vertical plane, the ring 10 extending in a horizontal plane. This track ring 12 is preferably semicircular having its ends secured to the edges of the azimuth ring 10, as shown in Figure 1, and the track ring 12 is provided upon its under face with a channel 13.

A substantially semi-circular band ring 14 is fitted to travel in the track ring 12 and is provided with a suitable inwardly extending rib 15 which snugly fits in the channel 13 and holds the band ring 14 against lateral displacement. The band ring 14 is graduated, as indicated at 16, upon one face from 0 to 90 degrees, the graduations extending from 0 at a point indicating the north pole, and running to 90 degrees away from the north pole. This is clearly illustrated in Figure 1. The band ring 14 may be rotated or turned within the track ring 12 and the azimuth ring 10. This band ring 14 is provided at one end with a threaded pin or lug 18 at a point constituting the central axis and at its opposite end with a removable threaded pin 17, and these points are designated as the north pole and south pole, respectively. These threaded pins 17 and 18 are designated in Figure 1 with the legends N and S to indicate the north and south poles. The pin 17 passes through an externally threaded lug 19, as shown in Figure 8.

A 180 degree arc band 20 has its ends journaled upon the respective lug or pin 18 at one end and at the other end upon the lug 19, as shown in Figure 55 ures 1 and 8, so that this arc band 20 may be swung upon the lugs 18 and 19 to be moved into and out of proper observation position. A suitable sighting slide 21 is slidably mounted upon this arc band 20, and this sighting slide 21 is provided with a sight opening 22 which is adapted to register with a circumferentially extending slot 23 formed in the arc band 20.

An outer arc band 24 is journaled also upon the lugs 18 and 19 at its respective ends, the ends of this arc band 24 being spaced from the ends of the arc band 20 by means of suitable spacing washers 25. This outer arc band 24 is slotted, as indicated at 26, to register with the slot 23. The arc band 24 may be swung from the position shown in Figure 3 in either direction, as indicated by the arrows, or may be swung to the position shown in full lines in Figure 4 when desired. Suitable nuts 27 are threaded upon the lugs 18 and 19 for preventing the accidental displacement of the arc bands 20 and 24 from these lugs. The arc band 20 has graduations thereon indicated from 0 to 80 degrees running from the center toward each end, and the arc band 24 is also similarly graduated, as shown in Figure 4, the last 10 degrees at each end being left unmarked because of the journal lugs 18 extending through the ends of the arcs 20 and 24. A sighting slide 28 is slidably mounted upon the arc band 24 and is provided with a suitable sight opening 29, the size and shape of the opening being controlled by a closure gate 30 which is provided with a curved outer edge 21, this being particularly used to permit an observer to visualize the appearance of the moon at different times, such for instance as the full, half, or quarter positions of the moon. The closure gate 30 may be slotted as indicated at 32, in which fits a suitable pin 33 to limit the sliding movement of the gate 30.

The outer arc band 24 carries at one end a circular plate 34 which is graduated, as illustrated in Figure 3, to indicate the hour angle, and this circular plate 34 is secured to one end of the outer arc band 24, as illustrated in Figure 8, to move with or rotate about the lug 18 as the outer arc band 24 is swung to the right or left. A vernier plate 35 is supported in brushing contact with the edge of the circular plate 34 and is suitably graduated, the vernier plate 35 being secured to and carried by a supporting bracket 36 riveted or otherwise secured to the outer face of the band ring 14.

Figure 2:
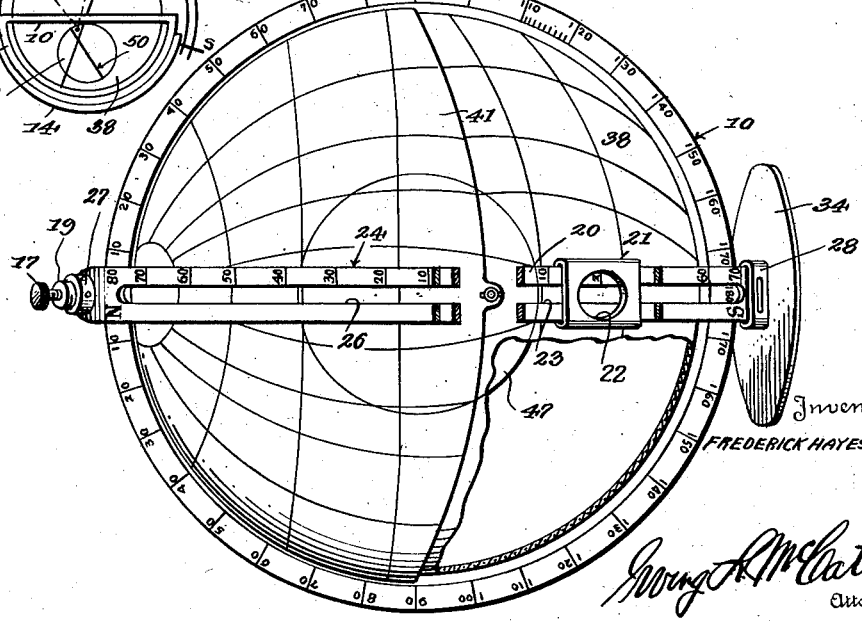
Figure 2 is a top plan view of the structure shown in Figure 1, certain parts being shown in section.

A hemispherical member 41 is located within the diameter of the azimuth ring 10, as shown in Figure 1, and also in Figure 2. This hemispherical member 41 constitutes one-half of a sphere or globe and is supported upon a frame 42 which consists of a bowed member 42a, to the ends of which is secured the member 41 by means of the journal pin 43. Thumb nuts 43a are carried by the journal pins 43 to hold the parts together. The journal pins 43 are in alignment with the equatorial line or the line of the equator which is adapted to run through the central axis of the azimuth ring 10, as shown in Figure 1. The frame 42 is provided with an inwardly extending brace or crane 42b which is engaged by the pin 17, the pin also passing through the bowed member 42a and globe 41 as shown in Figure 8. This hemispherical member 41 is preferably formed of very light, transparent material which could be very easily held in place by the frame 42. The hemispherical member 41 may have indicated thereon the celestial bodies such as the sun, moon, stars, and the like, and also certain degrees of latitude and longitude, and the desired poles also marked thereon, as shown in Figure 1. I preferably employ two of these hemispherical members, one indicating the northern hemisphere, and the other indicating the southern hemisphere, and these are so mounted as to permit the hemispherical members to be removed and replaced or substituted one for the other depending upon whether or not the celestial bodies visible from the southern or northern hemispheres are to be observed. These sectional hemispheres are designated 41 and 38 respectively, and may be mounted for pivotal movement one within the other as shown in Figure 8, so that they may be swung open to a proper position whereby access may be had to the interior of the hemispheres. In this way, the operator may reach the globe 45 with his hand and adjust the same to a desired position. When the sectional hemispheres 38 and 41 are assembled, as shown in Figure 8, the hemispheres 38 and 41 may rotate in a clockwise direction for a distance of 90 degrees.

The inwardly extending brace or crane 42b is provided with a projecting arm 42c having a projecting eye 42d which extends through a supporting eye 37 of the hanger guide 46. A bowed hanger 45 is slidably adjusted through the hanger guide 46 and may be held in an adjusted position by means of the screw 37a. This bowed hanger 45 suspends the globe 47 which simulates the world, and this globe may be provided with suitable geographic outlines, as well as the outlines to indicate the proper latitude and longitude. The globe 47 is provided with laterally extending journal lugs 48 which are journaled in the ends of the hanger 45 so as to permit the rotation of the globe upon these journals. This may be done by the hand of the operator to manually move the globe 47 to the desired position. The celestial globe 41 may be formed in two hemispherical sections, one fitting within the other, as stated above.

If desired, a number of different types of globes simulating the world may be employed upon which may appear certain geographical formations, certain animal or vegetable life, or any desired designation for educational purposes and these globes may be substituted for the globe 47 depicted in the drawings merely by springing the ends of the hanger 45 out of engagement with the lugs 48 to permit the removal of one globe and the substitution of the other.

By carefully noting Figure 8, it will be seen that the globe 47 is suspended upon the eye 37 so as to freely swing and at all times hang in a vertical suspended position.

In reading the position of a celestial body where the Nautical Almanac gives the declination at a given date and time, the globe 47 is set so that the city, town, or longitude and latitude is below the supporting eye 37. The band ring 14 is then moved to indicate the same latitude as on globe 47 under eye 37. The true relation of the celestial sphere to the terrestrial sphere is now obtained. Next, the index slide 21 or 28 is set for the declination as given for the body which it is desired to demonstrate, according to the Nautical Almanac for the time and date, then by moving arc 20 or 24 the exact movement of the course of that body is shown as it would look to a person on the earth at the position set under eye 37 on the globe 47. The reading on hour angle arc 34 will show the time the body is directly overhead or on the meridian, or the number of degree east or west of the meridian.

Figure 10:
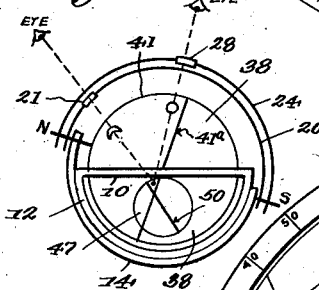
Figure 10 is a diagram illustrating one typical problem demonstrated by the use of the device shown in Figures 1 to 9, inclusive.

As explained, the primary purpose of the present invention is that of an educational medium which is especially adapted to permit a student to visualize the location, path of travel, and appearance of certain celestial bodies with respect to his location on the earth. In carrying out the object of this invention, and by the use of the apparatus just described, a student will locate his position upon the earth by moving the earth globe 47 to a point where he may observe his own geographical location. Then by consulting the Nautical Almanac which definitely gives the relative positions of the celestial globe with respect to the position of the observer who located himself upon the globe of the world 47, the celestial globe 41 or the globe 38 is then properly set. The Nautical Almanac will tell the student the exact declination of the body which he desires to demonstrate, that is, how far it has moved in the heavens relative to the position of the observer. Then the sight 21 is adjusted upon the arc 20 at that position which is ascertained from the almanac. The student may then hold the instrument in his hand and by viewing through the sight opening in the sight 21, the position of the heavenly body with respect to the earth and the observer on the earth will be illustrated by the observer's eye, the aperture 22, position of the celestial body being observed, and the point on the globe as shown in the diagrammatic Figure 10.

If he is demonstrating the moon, the slide 30 may be adjusted to visualize the full, half, or quarter views of the moon.

The second arc 24 may be used to indicate the relative positions of any two celestial bodies at the same time.

The position of the sun at any given time as to day and hour may be obtained by consulting the Nautical Almanac which will give the proper degree or position or declination of the slide 28. In the same manner, the relative position of any other celestial bodies may be ascertained.

If it is desired to have the student observe directly the sun, the latitude arc is set for the latitude of the place of the observer. The index slide 28 on the arc 24 which is the outer one, is then set to the proper declination taken from the Nautical Almanac. The instrument is then pointed due north and south, and the light from the sun is brought through the opening in the slide 28 until it strikes the point of location of the observer indicated on the globe 47. The student may then swing the arc 24 from right to left, and indicate the path of travel of the celestial body being observed from the time it rises in the morning until it sets in the evening.

Because of the structure illustrated, the pin 17 may be disconnected and withdrawn from the threaded lug 19 of the ring 12, when it is desired to remove the celestial globe as will be obvious by considering Figure 8. The two sections of the hemispheres 41 and 38 may be bodily lifted out of engagement with the ring 14 leaving only the azimuth ring 10, the thickened portion of the ring 14 and the two arc bands 20 and 24 and the respective parts which are carried thereby.

Having described the invention, what is claimed as new is:

1. An astronomical instrument of the class described comprising a support constituting an azimuth ring extending substantially in a horizontal and level position, a track ring suspended below the azimuth ring across the center thereof and suspended below in a semi-circular formation, a band ring slidably mounted for circumferential sliding movement upon said track ring, a celestial globe carried by said band ring and rotatable with said band ring, a globe simulating the world suspended within the celestial globe, a pair of arc bands pivotally connected to said band ring at diametrically central opposite points, an hour angle scale operable with one of said arc bands, a sighting gage slidably mounted upon each arc band, the band ring being graduated and being adjustable for moving the celestial globe to a proper position for obtaining a proper latitude measurement, the arc bands carried by said band ring being capable of swinging movement from side to side with respect to the vertical axis of the band ring.

2. An astronomical instrument of the class described comprising a support constituting an azimuth ring extending substantially in a horizontal and level position, a track ring suspended below the azimuth ring across the center thereof and suspended below in a semicircular formation, a band ring slidably mounted for circumferential sliding movement upon said track ring, a celestial globe carried by said band ring and rotatable with said band ring, a globe simulating the world suspended within the celestial globe, a pair of arc bands pivotally connected to said band ring at diametrically central opposite points, an hour angle scale operable with one of said arc bands, a sighting gage slidably mounted upon each arc band, the band ring being graduated and being adjustable for moving the celestial globe to a proper position for obtaining a proper latitude measurement, the arc bands carried by said ring being capable of swinging movement from side to side with respect to the vertical axis of the band ring, and said band ring being formed in two separable sections to permit of the removal of one section and the removal of the celestial globe as well as the first mentioned globe.

3. An astronomical instrument of the class described comprising an azimuth ring suitably graduated, a track ring suspended below the azimuth ring in semicircular formation and having a channel formed in its under face, a band ring slidably mounted within the channel, a celestial globe carried by said band ring for bodily movement with the band ring, an hour angle arc-shaped member pivotally secured at points marked north and south upon said band ring, a second arc also pivotally secured in a similar manner to said band ring, and an index sight slidably mounted upon each arc shaped member.

4. An astronomical instrument of the class described comprising an azimuth ring suitably graduated, a track ring suspended below the azimuth ring in semicircular formation and having a channel formed in its underface, a band ring slidably mounted within the channel, a celestial globe carried by said band ring for bodily movement with said band ring, an hour angle arc shaped member pivotally secured at points marked north and south upon said band ring, a second arc-shaped member also pivotally secured in a similar manner to said band ring, an index sight slidably mounted upon each arc-shaped member, said celestial globe being formed of a pair of interfitting pivotally secured sections, one section being movable within the other for the purpose of permitting the opening of the globe to allow access to the interior thereof, and a second globe simulating the world being mounted within the interior of the celestial globe.

5. An astronomical instrument of the class described comprising an azimuth ring suitably graduated, a track ring suspended below the azimuth ring in semicircular formation and having a channel formed in its under face, a band ring slidably mounted within the channel, a celestial globe carried by said band ring for bodily movement with the band ring, an hour angle arc-shaped member pivotally secured at points marked north and south upon said band ring, a second arc-shaped member also pivotally secured in a similar manner to said band ring, an index sight slidably mounted upon each arc band, said celestial globe being formed of a pair of interfitting pivotally secured sections, one section being movable within the other for the purpose of permitting the opening of the globe to allow access to the interior thereof, a second globe simulating the world mounted within the interior of the celestial globe, and one of said index slides having means for visually demonstrating the changes of the appearance of the moon as viewed from the earth's surface.

6. An astronomical instrument of the class described comprising an azimuth ring adapted to extend in a level and horizontal position, a track ring suspended below the azimuth ring adapted to point north and south and arranged in a semicircular formation, a band ring slidably mounted upon said track ring and moving circumferentially thereof, a pair of semicircular arc bands pivotally secured to said band ring at the axis thereof, a sight index slidably mounted upon each arc band, a celestial globe carried by said band ring and movable therewith, one of the arc bands having means for indicating the hour angle of a celestial body, a second globe simulating the world mounted within the celestial globe, the celestial globe comprising a pair of intersliding sections pivotally secured together and capable of opening one with respect to the other for permitting access to the interior of the celestial globe and permitting the manual adjustment of the globe simulating the world, a frame mounted within said celestial globe and secured thereto, said frame being supported upon said band ring, said celestial globe being suspended from said frame, a removable supporting pin carried by the band ring constituting a journal for the celestial globe and said frame and adjustable means for supporting said second globe within the celestial globe.

7. An astronomical instrument especially adapted for visible demonstration of the relative location of a celestial body with respect to the surface of the earth, comprising an azimuth ring extending in a horizontal plane, a track ring extending in a vertical plane and suspended below the azimuth ring, a latitude arc-shaped member constituting a track ring slidably mounted upon said track ring, a celestial sphere carried by said latitude arc-shaped member and movable therewith, said celestial sphere having the position of a plurality of celestial bodies designated thereon, a terrestrial globe suspended within said track ring and mounted within the celestial sphere and having a plurality of defined positions designated upon the globe, an arc-shaped member pivotally secured at the axis of said band ring, and a sight index slidably mounted upon the last mentioned arc-shaped member for permitting a student to properly set the instrument to the proper latitude and at the proper hour angle after properly adjusting the celestial sphere at the proper azimuth reading to visualize the point on the terrestrial globe upon which an imaginary beam of light from a selected celestial body located upon the celestial sphere may be cast at a selected time.

8. An astronomical instrument especially adapted for visible demonstration of the relative location of a celestial body with respect to the surface of the earth, comprising an azimuth ring extending in a horizontal plane, a track ring extending in a vertical plane and suspended below the azimuth ring, a latitude arc-shaped member constituting a track ring slidably mounted upon said track ring, a celestial sphere carried by said latitude arc-shaped member and movable therewith, a terrestrial sphere carried by said celestial sphere and mounted within the celestial sphere, an arc-shaped member pivotally secured at the axis of said band ring, and a sight index slidably mounted upon the arc-shaped member for permitting a student to properly set the instrument to the proper latitude and at the proper hour angle after properly adjusting the celestial globe at the proper azimuth reading to visualize the point upon the terrestrial globe upon which a beam of light from a celestial body located upon the celestial globe will be cast at a selected time, a second arc-shaped member pivotally mounted for lateral swinging movement upon the axis of said band ring, a sight index slide mounted upon said second arc shaped member and adapted to facilitate the demonstration of the relative location of two celestial bodies with respect to a selected point of location upon the surface of the terrestrial body.

9. An instrument of the class described comprising an azimuth scale, means upon which the relative locations of a plurality of bodies simulating heavenly bodies are indicated, means for supporting said last mentioned means for diametrical movement with respect to said azimuth scale, means simulating the earth having a plurality of defined positions indicated thereon, said last mentioned means being supported below said azimuth scale in a position whereby one of the defined positions indicating a selected position of an observer upon said last mentioned means may be brought to a position in substantially the same plane with said azimuth scale, and means for measuring the light angle of an imaginary beam of light cast by a selected simulation of a heavenly body upon a selected defined position upon the means simulating the earth with respect to the eye of an observer at a selected time of the year and hour of the day.

10. An instrument of the class described comprising a celestial sphere upon which the relative locations of various bodies simulating heavenly bodies are indicated, an azimuth scale adapted to be supported in a level position pointing due north and south, a globe simulating the world suspended below said azimuth scale and having the highest point of its circumference in substantially the same plane with the azimuth scale, said globe having a plurality of defined positions indicated thereon, said globe being mounted for movement whereby a selected defined position may be brought to a position in substantially the same plane with the azimuth scale, and means for measuring the angle of a beam of light cast from a selected body simulating a heavenly body upon a selected defined position upon the globe at a given time of the year and hour of the day with respect to the eye of an observer.

11. An astronomical instrument of the class described comprising a globe simulating the world and having a plurality of defined positions designated thereon, a second globe simulating a celestial sphere located adjacent the first mentioned globe and having the positions of a plurality of heavenly bodies designated thereon, and means for measuring the angle of an imaginary beam of light from a selected heavenly body designated upon the second globe as cast upon a selected defined position on the first globe.

12. An astronomical instrument of the class described comprising a support, a globe simulating the world and having a plurality of defined positions designated thereon, the globe being carried by said support, a hemisphere adjustably mounted upon said support for movement relative to said globe, said hemisphere having the position of a plurality of heavenly bodies designated thereon, and means carried by said support adjacent the hemisphere for measuring the angle of an imaginary beam of light from a selected heavenly body on the hemisphere as cast at a given time upon a selected defined position upon the globe which simulates the world.

13. An astronomical instrument of the class described comprising a support, a globe simulating the world carried by said support and having a plurality of defined positions designated upon the globe, a hemisphere adjustably mounted upon the support for movement relative to the globe, said hemisphere having the position of a plurality of selected heavenly bodies indicated thereon, means carried by said support for measuring the angle of an imaginary beam of light from the location of a selected heavenly body on the hemisphere as cast upon a selected defined position on the globe at a given time, and means for adjustably supporting the globe for rotating movement in either of two selected directions at right angles to each other.

14. An astronomical instrument of the class described comprising a support, a globe simulating the world carried by said support, a hemisphere adjustably mounted upon the support for movement relative to the globe, said globe having a plurality of defined positions designated thereon, said hemisphere having the position of a plurality of heavenly bodies indicated thereon, means for measuring the angle of an imaginary beam of light from a selected heavenly body at a given time as it is cast upon a selected defined position upon the globe simulating the world, means for adjustably supporting the globe for rotating movement in either of two selected directions at right angles to each other, said last mentioned means constituting a hanger and a hanger slide, journal means formed upon the globe fitting in the ends of said hanger for supporting said globe and permitting the rotation of the globe, and said hanger slide supporting said hanger in sliding relation to permit of the sliding adjustment of the hanger within the hanger slide.

FREDERICK HAYES HAGNER.